US009762409B2

(12) United States Patent
Ringkamp et al.

(10) Patent No.: US 9,762,409 B2
(45) Date of Patent: Sep. 12, 2017

(54) INTERFACE CIRCUIT HAVING A DATA BUS INTERFACE

(71) Applicant: Pepperl + Fuchs GmBH, Mannheim (DE)

(72) Inventors: Jan Ringkamp, Mannheim (DE); Steffen Graber, Mannheim (DE); Renato Kitchener, West Sussex (GB)

(73) Assignee: Pepperl + Fuchs GmbH (DE)

( * ) Notice: Subject to any disclaimer, the term of this patent is extended or adjusted under 35 U.S.C. 154(b) by 0 days.

(21) Appl. No.: 15/036,890

(22) PCT Filed: Dec. 11, 2015

(86) PCT No.: PCT/EP2015/079478
§ 371 (c)(1),
(2) Date: May 16, 2016

(87) PCT Pub. No.: WO2016/092092
PCT Pub. Date: Jun. 16, 2016

(65) Prior Publication Data
US 2016/0352534 A1    Dec. 1, 2016

(30) Foreign Application Priority Data
Dec. 12, 2014 (GB) .................................. 1422103.0

(51) Int. Cl.
*H04L 12/40* (2006.01)
(52) U.S. Cl.
CPC .. *H04L 12/40045* (2013.01); *H04L 12/40006* (2013.01); *H04L 12/4013* (2013.01); *H04L 2012/4026* (2013.01)

(58) Field of Classification Search
CPC ......... H04L 12/40045; H04L 12/40006; H04L 12/4013; H04L 2012/4026
See application file for complete search history.

(56) References Cited

U.S. PATENT DOCUMENTS

| 7,315,157 | B2 * | 1/2008 | Chapuis | ................ | H02M 3/157 |
| | | | | | 323/282 |
| 2002/0176556 | A1 * | 11/2002 | Sumiya | ............. | H04L 12/40032 |
| | | | | | 379/167.01 |

(Continued)

OTHER PUBLICATIONS

International Search Report corresponding to PCT/EP2015/079478, dated Mar. 9, 2016 (13 pgs.).

(Continued)

*Primary Examiner* — Kenneth Lam
(74) *Attorney, Agent, or Firm* — Lerner, David, Littenberg, Krumholz & Mentlik, LLP

(57) ABSTRACT

There is provided an interface circuit, a network switch or network device coupler incorporating the interface circuit, and a network incorporating the network switch or network device. The interface circuit has a data bus interface (7) for connecting a data bus to either a first device (6) that communicates in a first signalling protocol or a second device (6) that communicates in a second signalling protocol. The data bus has two bus conductors that provide combined power and data. A voltage source (12) powers the data bus. The voltage source (12) is connected to the data bus via a reactance (10) and then a first resistance (4) connected in series. An output of a transmitter (13) is connected via a second resistance (3) to a point between the reactance (10) and the first resistance, to modulate the data bus.

18 Claims, 4 Drawing Sheets

(56) References Cited

U.S. PATENT DOCUMENTS

| | | | |
|---|---|---|---|
| 2006/0036382 A1* | 2/2006 | Paz | G01R 27/02 |
| | | | 702/76 |
| 2008/0211621 A1* | 9/2008 | Nowottnick | G06K 19/0726 |
| | | | 340/5.2 |
| 2008/0304196 A1* | 12/2008 | Kessler | H02H 9/008 |
| | | | 361/93.1 |
| 2011/0131455 A1* | 6/2011 | Law | H04B 3/548 |
| | | | 714/40 |
| 2011/0279939 A1* | 11/2011 | Kitchener | H02J 1/10 |
| | | | 361/87 |
| 2013/0082678 A1* | 4/2013 | Kitchener | H04B 3/02 |
| | | | 323/364 |
| 2015/0163123 A1* | 6/2015 | Kitchener | H04L 43/50 |
| | | | 370/252 |
| 2015/0171793 A1* | 6/2015 | Regier | H03F 1/26 |
| | | | 330/251 |
| 2016/0141955 A1* | 5/2016 | Seifried | H02M 3/156 |
| | | | 323/282 |

OTHER PUBLICATIONS

Hartwich, Florian: "CAN with Flexible Data-Rate," Proceedings of the 13th International CAN Conference, Mar. 14, 2012, XP055133740, retrieved from the Internet: URL:http://www.can-cia.org/fileadmin/cia/files/icc/13/hartwich.pdf (retrieved on Aug. 7, 2014); 10 pgs.

* cited by examiner

INTERFACE CIRCUIT HAVING A DATA BUS INTERFACE

CROSS-REFERENCE TO RELATED APPLICATIONS

The present application is a national phase entry under 35 U.S.C. §371 of International Application No. PCT/EP2015/079478 filed Dec. 11, 2015, which claims priority from GB 1422103.0 filed Dec. 12, 2014, all of which are hereby incorporated herein by reference.

The present invention relates to an interface circuit providing a two-wire data bus for connecting to devices.

BACKGROUND OF THE INVENTION

Two wire distributed control systems are used in many industrial settings for controlling and monitoring a plurality of devices. Such systems operate under particular protocols, of which one example is Fieldbus. This is the name of a family of industrial computer network protocols used for real-time distributed control, now standardized as IEC61158-2. A complex automated industrial system, for example a fuel refinery, usually needs an organized hierarchy of controller systems to function. In this hierarchy there is a Human Machine Interface (HMI) at the top, where an operator can monitor or operate the system. This is typically linked to a middle layer of programmable logic controllers (PLC) via a non time critical communications system (e.g. Ethernet). At the bottom of the control chain is the Fieldbus, which links the PLCs to the devices which actually do the work such as sensors, actuators, electric motors, console lights, switches, valves and contactors. The Fieldbus is usually a two wire combined power and data network, which provides both power and communications to the field devices.

In a typical combined two wire Fieldbus electrical power and communications circuit there is a power supply, an Intrinsic Safety barrier of some kind, a trunk section leading out into the field, and a number of device couplers with spurs connected thereto, on which the field instruments are mounted. The trunk and the spurs together form a "segment". The Intrinsic Safety barrier divides the circuit into an Intrinsically Safe side and a non-Intrinsically Safe side. The power supply, the PLCs and other systems like physical layer diagnostic modules which measure physical layer attributes of the electrical circuit and the network hardware, and in part the physical software or protocol being used, are located in the non-Intrinsically Safe side of the circuit, usually in a control room. The trunk, the device couplers, the spurs and the field instruments are located in the Intrinsically Safe side, out in the field.

The various components of the system communicate with one another using the Fieldbus IEC61158-2 communications protocol, which is a Manchester encoding system. Data telegrams are transmitted either on dedicated communications circuits, or on the same electrical circuits as the power to drive the field instruments. The data telegrams serve to control and to monitor and diagnose the field instruments in use. However, it is also possible to use Fieldbus, or any other similar two-wire protocol, in ordinary non-Intrinsically Safe environments and without any Intrinsic Safety barrier.

The IEC61158-2 Fieldbus communication protocol, along with other similar data systems such as DSL, Ethernet, HART and so on, and those which will eventually replace IEC61158-2 Fieldbus, comprise a set of discrete physical layer limits within which the communications signals, and the hardware which hosts them, must operate. These physical layer limits include aspects of the signalling, including the data shape and timing rules. These limits and tolerances are very conservative, so the resulting systems are highly robust and not prone to failure. In addition, this conservative approach means that when a system is physically installed it usually operates correctly first time without the need for adjustment, even though in practice a system can operate somewhat differently to how it was initially designed.

The Fieldbus solution was introduced over a decade ago, and demand is now growing for a higher speed data rate to meet technology advancements and to increase the network efficiency. Therefore, Fieldbus instruments or devices will eventually become 'legacy devices' following the introduction and maturity of a field based higher speed communication standard, which may be an extension to the IEEE802.3 Ethernet standard, or it may be an extension to any other similar or future standard, not discounting an IEC61158-2 annex or supplement.

Because IEC61158-2 Fieldbus devices have a very large installed base, and because such devices are commodities that are often reused (or kept in place) when upgrading the process plant cabling infrastructure, it is desirable that any new platform or interface should be able to accommodate IEC61158-2 Fieldbus devices so that the transition cost, to the customer, can be kept low.

Customers may also want to keep IEC61158-2 Fieldbus devices uniform across a plant upgrade in order to keep the spares inventory as small as possible, yet benefit from a higher speed communication backbone, which can use the same existing cabling with minimal changes.

Furthermore, to establish a new high-speed backbone, allowing both new and legacy devices to optionally connect to the same interface switch port or spur port would be more acceptable to the customer. This would give the customer a greater selection of legacy and high speed instruments to choose from on the onset, when not all instrument variants are likely to be available with high speed communication. Upgrading to higher speed instruments when these become available at a later date will then be a simple process requiring minimal changes and/or expense.

It is therefore an aim of the invention to provide an interface circuit that can be used to connect to devices having different signalling protocols via a two wire combined power and data bus.

SUMMARY OF THE INVENTION

According to various embodiments of invention, there is provided an interface circuit according to any one of the appended claims 1 to 16. The interface circuit has a data bus interface and a transmitter and receiver for sending and receiving data via the data bus interface. The data bus interface comprises two bus conductors consisting of a positive polarity conductor and a negative polarity conductor that provide combined power and data, and connector terminals for connecting the two bus conductors to one of a first device that communicates in a first signalling protocol and a second device that communicates in a second signalling protocol, the first and second signalling protocols being different protocols to one another. The interface circuit is configured to select between the first signalling protocol and the second signalling protocol depending on which one of the first and second devices are connected via the connector terminals. The interface circuit further comprises a voltage source for powering the two bus conductors, the voltage source being connected to the two bus conductors via a reactance and then a first resistance connected in series, wherein an output of the transmitter is connected via a second resistance to a point between the reactance and the first resistance, to modulate the voltage between the two bus conductors.

Accordingly, the interface circuit can transmit and receive a physical layer compliant signal to/from both the first device having the first signalling protocol and the second device having the second signalling protocol. The first signalling protocol may have a first signalling speed and the second signalling protocol may have a second signalling speed, the second signalling speed being higher than the first signalling speed. For example, the first device may be an IEC61158-2 legacy device and the second device may be a higher speed device than the first device. The signalling speed of the higher speed device may be over 100 times higher than the signalling speed of the legacy (lower speed) device.

The first and second signalling protocols may have different characteristics to one another at the physical layer of the OSI 7-layer model, so that they differ from one another on a physical level. For example, the first and second signalling protocols may have different modulation types, and/or voltage signals levels, and/or signal timing requirements from one another. Additionally, the first and second signalling protocols may differ from one another in terms of their higher layer characteristics, for example their data encoding and/or error correction types.

The circuit arrangement of the first and second resistances allows the voltage source to provide sufficient power for both legacy and higher speed devices, whilst maintaining a sufficient input impedance (loading) at the data bus interface for the legacy or higher speed device. In some embodiments, the legacy device requires this input impedance, whereas the higher speed device does not, either by virtue of its speed and/or presence of internal terminators.

The input impedance presented by the data bus interface to the connected device is important, since the device may send signals by modulating the current that it draws from the data bus. Accordingly, the input impedance presented by the data bus interface determines the amount of change in the voltage between the positive and negative polarity conductors of the data bus that occurs when the connected device sends signals by modulating the current that it draws. The voltage changes must be maintained within specified limits so that the signals can be read by the receiver of the interface circuit.

The circuit arrangement of the first and second resistances means that the input impedance presented by the data bus interface to the connected device is largely determined by the sum of the first and second resistances, whereas the power that the voltage source is able to supply to the data bus interface is largely determined by the first resistance, and not the second resistance. Accordingly, the resistance of the first resistance can be minimised to improve power delivery, without compromising the input impedance presented by the data bus interface to the connected device since the input impedance can be made up to a sufficient value by way of the second resistance. For non-intrinsically safe circuits which do not have the same current limiting requirements, the value of the first resistance may be made much smaller than the value of the second resistance.

For IEC60079-11 intrinsically safe power sourcing interfaces, specifically in accordance with FISCO, both the legacy and the higher speed device preferably have parameters that match the same power sourcing parameters of the interface, and are at least compliant with the IEC60079-11-FISCO standard.

The data bus interface preferably has an input impedance (load impedance) that meets the needs for both IEC61158-2 legacy devices, and higher speed devices, preferably without modification or adjustment to the interface circuit. The load impedance for legacy devices is greatly influenced by the worst case network configuration, however in this case, the connection to the legacy device is a direct two-wire connection from the interface circuit to the legacy device, and so the allowances for signal distortion/jitter can be relaxed. If the loading impedance is obtained using active circuits (gyrators) for the reactance, then these may or may not require adjustment/modification, which could be performed automatically and/or manually.

Preferably signalling levels are the same or within specification for both the legacy and higher speed device signalling protocols, preferably without modification or adjustment to the interface circuit. In some embodiments, to achieve the correct signalling levels, it may be necessary to change the transmitting device's peak to peak output voltage, either automatically and/or manually. Preferably, the voltage between the two bus conductors should not fall below or increase above the minimum and maximum input voltage specifications of the first and second signalling protocols.

The first resistance has a rated resistance, and is preferably an infallible resistor. As is known in the art, infallible resistors are resistors which are configured to present at least the rated resistance upon occurrence of a fault. Therefore, a fault may cause an open circuit, but not a short-circuit.

To help present a balanced impedance to the connected device so that the signals sent between the transmitter and the device are less susceptible to electromagnetic interference, the first resistance may be split between the positive and negative polarity conductors. Specifically, the first resistance may comprise a series resistor in the positive polarity conductor and a series resistor in the negative polarity conductor. The rated resistance of the first resistance is then the sum of the rated resistances of the two series resistors. Preferably, the series resistors have a same rated resistance as one another, to help balance the impedance, however they may have different rated resistances to one another to correct any imbalances in impedance present elsewhere in the interface circuit. For the same reason, the second resistance may also be split between the positive and negative polarity conductors in the same manner.

To help comply with the electrical requirements of IEC61158-2 Fieldbus devices, the first resistance may be rated at 50 Ohms, and the second resistance may also be rated at 50 Ohms. Accordingly, the first resistance may be formed of two 25 Ohm series resistors, one in the positive polarity conductor and one in the negative polarity conductor, and the second resistance may also be formed of two 25 Ohm series resistors, one in the positive polarity conductor and one in the negative polarity conductor.

To provide direct current (dc) isolation between the output of the transmitter and the two bus conductors, the output of the transmitter may be connected via a capacitance and the second resistance to the point between the reactance and the first resistance, the capacitance and second resistance being connected in series. Since the output impedance of the transmitter output is low, it effectively forms a short-circuit to alternating current (AC) signals that are directed towards it, and so the capacitance and second resistance act as a terminator. In the case where the second resistance is formed of two balanced series resistors, the capacitance is also formed of two balanced series capacitors.

It is desirable that any signal transmitted by the transmitter into a connected device via the data bus interface should be stable and not be prone to oscillation or instability or lead to signal distortion should the load impedance of the device vary from a fully terminated load, to higher impedance, or when other circuits are introduced. Therefore, the interface circuit may comprise an additional impedance and switch for switching the additional impedance into connection between the positive and negative polarity conductors of the two bus connectors, the additional impedance being connected to the two bus conductors at a point between the first resistance and the connector terminals. Accordingly, the additional impedance can be switched in if required to dampen any signal instability that occurs at the data bus interface.

The interface circuit may further comprise another impedance connected between the positive and negative polarity conductors of the two bus connectors, this another impedance being connected to the two bus conductors via the first and second resistances at the output of the transmitter. Therefore, this impedance can help dampen any signal instability that may occurs at the output of the transmitter. Optionally, this impedance may be connected to the two bus conductors via a switch, so that it can be switched in or out of the interface circuit depending on requirements.

Electrical components that are connected to conduct current between conductors of the same polarity are considered to be series components, for example the series resistors of the first or second resistances. In contrast, electrical components that are connected to conduct current between conductors of opposite polarity are considered to be shunt components, for example the additional impedance and switch, or the another impedance and switch.

The interface circuit must know, or be able to establish, what device type is attached during device attachment/powering up', or at any time when attached and powered, so that the signalling protocol can be established and maintained from that point on.

Preferably, the interface circuit polls the connected device using one protocol, and if there is no response returned from the device, the interface circuit will use a different protocol, in which case, a response will be returned, providing there is a functional device attached. Once communication is established with a device in a given protocol, then that protocol is maintained, requiring no further protocol poll. Specifically, the interface circuit may be configured to select between the first signalling protocol and the second signalling protocol by transmitting data via the two bus conductors in a selected one of the first and second signalling protocols, and:

if a valid response to the transmitted data is received by the receiver, determine that a device using the selected one of the signalling protocols is connected to the data bus interface; or if a valid response to the transmitted data is not received by the receiver, transmit data via the two bus conductors in another one of the signalling protocols, and determine that a device using that one of the protocols is connected to the data bus interface if a valid response to that data is received by the receiver.

Alternatively, the signalling protocol may be detected based on a known relationship between the device current and the type of signalling protocol; the device current may be measured and the appropriate signalling protocol may be selected based on this known relationship. Or, the signalling protocol may be detected based on the device's initial attachment characteristic, for example an amount of current that is initially drawn by the device when the device is initially attached (connected) to the data bus interface. Therefore, the interface circuit may not need to instigate communication first, to establish the type of device connected, from a device response.

As another alternative, interface circuit may be instructed/told, in advance, what type of device is attached to the data bus interface, without requiring any further action or negotiation so that the correct protocol and signalling is initiated on the onset. This may also apply to any switched components that may need to be introduced for a legacy device, where this can be executed in advance. This process may be performed automatically or manually, locally or remotely where it may be automatically executed by referring to a design database, which can be manually or automatically overridden.

The interface circuit may still send data to check the established type of device is correct, after the device type has been established using the above alternate methods.

Or, the connected device may actually be able to communicate in both the first and second signalling protocols, or be partially bi-protocol so the device can 'tell' the interface circuit which protocol is preferred by the device, in either protocol. Although, if the first device is a legacy device, then it will not be able to use the higher speed protocol.

Optionally, if communication is lost, or if the device disconnection is detected, then on device reinstatement or during the 'silence', the protocol detection/assessment may be carried out again.

To further improve the ability of the interface circuit to cope with devices of different protocols, the transmitter may comprise a plurality of transmitter circuits which are switched between depending on which signalling protocol is selected to be used by the transmitter. Should communication from a given type of transmitter circuit to a given type of device not be possible or incompatible, then an alternative transmitter circuit, which may be compatible, may be automatically or manually switched into position so that communication may be successful with that device. The receiver may also comprise a plurality of receiver circuits, which are switched between depending on which signalling protocol is selected to be used by the transmitter.

The terminals and cabling hardware and specification between the data bus interface and the device is preferably the same for IEC61158-2 legacy devices and the higher speed devices, so that no adapters or modifications are required. Then, a legacy device can be swapped, one-for-one, with a higher speed device using the exact same cable cores/wires. Accordingly, the first and second devices may be connectable to the connector terminals by connecting a first end of a bus cable to the connector terminals, and by connecting a selected one of the first device and the second device to a second end of the bus cable. Furthermore, the first device may be connectable to the connector terminals by connecting a first bus to the connector terminals, the first bus being connected to the first device, and the second device may be connectable to the connector terminals by connecting a second bus to the connector terminals, the second bus being connected to the second device.

Advantageously, the first and second resistances may sum to a value matching a characteristic impedance of the bus cable. This characteristic impedance may be required by the second signalling protocol, so that the second device can create the desired signals on the bus cable. The characteristic impedance is relevant for the second signalling protocol when the second signalling protocol has a sufficiently high frequency compared to the length of the bus cable for transmission line effects to become important. Making the sum of the first and second resistances equal to the characteristic impedance of the bus cable helps prevent signals from the device being reflected back into the bus cable from the interface circuit, as will be apparent to those skilled in the art.

The length of the bus cable from the data bus interface to the device is preferably 120 m, plus or minus an acceptable number of meters, such that for legacy devices, this will be classified as a spur, requiring no further terminators at the device end of the bus cable. Where higher speed devices are attached to the bus cable, there may be a terminator integrated in the higher speed device, and the cable may therefore extend beyond 120 m or be extended at a later date if used for a higher speed device. Preferably, the first resistance and the second resistance sum to 100 Ohms, for impedance matching with a 100 Ohm characteristic impedance cable.

According to the appended claim 17, the interface circuit may be implemented as part of a network switch or a network device coupler. If the summated signal current within the switch or the device coupler is limited or restricted, then the attachment of any device should not exceed this summated current limit. According to the appended claim 18, the network switch or network device coupler may form a network together with the bus cable and one of the first and second devices.

In use, the data bus extends from the interface circuit to either the first device, or the second device. Normally, there are only two devices connected via the data bus, that is the interface circuit and either one of the first and second devices, so that the data bus is constituted by a simple point-to-point data link. However, in some circumstances it may be possible for more than one first device, or more than one second device, to be connected to the data bus, depending on the characteristics of the particular devices. The first and second devices typically cannot be used on the same data bus as one another, unless at least one of the devices is capable of operating in both first and second signalling protocols, so that a single signalling protocol is used over the bus.

DETAILED DESCRIPTION

Embodiments of the invention will now be described by way of non-limiting example only and with reference to the accompanying drawings, in which.

Figure 1A:
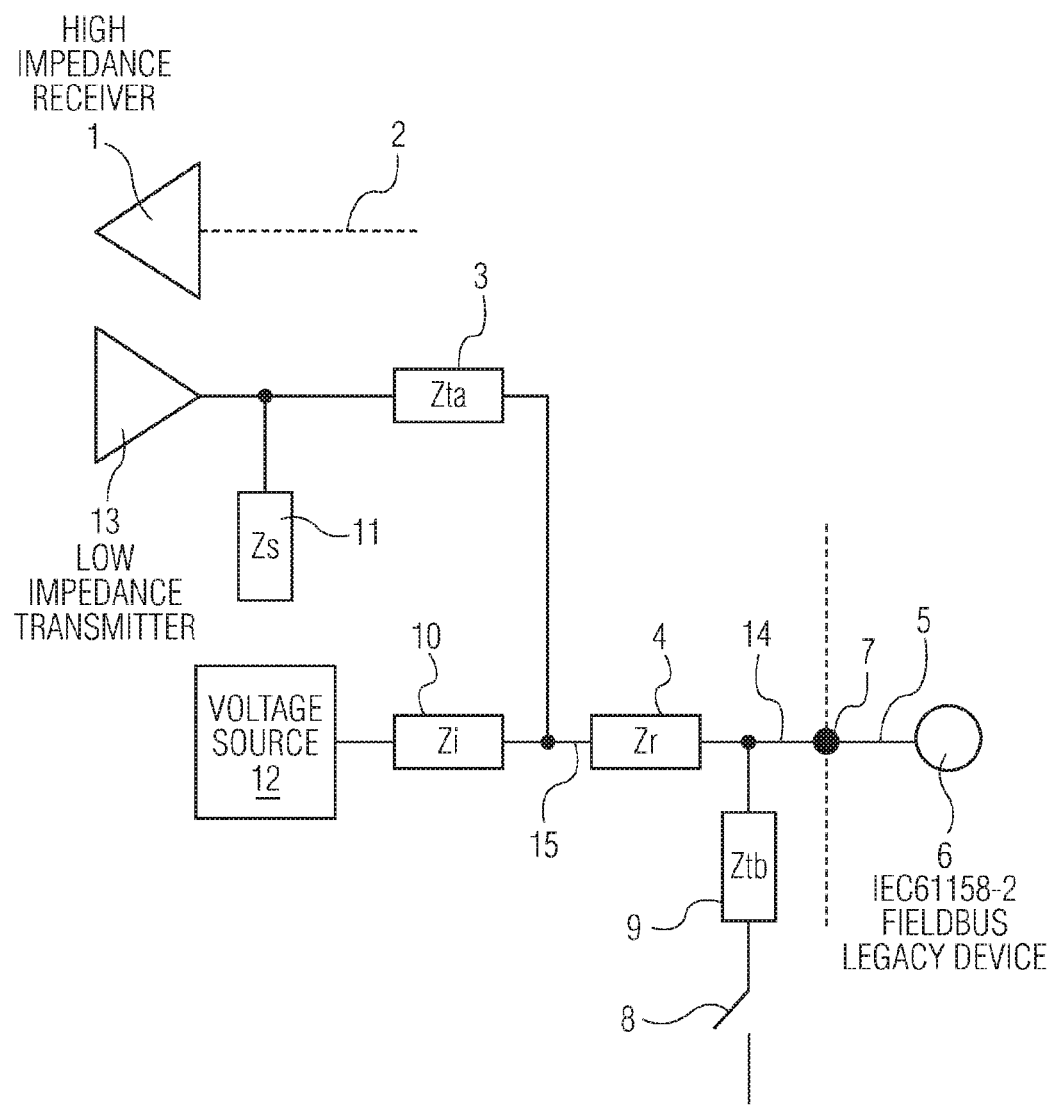
FIG. 1a shows a schematic circuit diagram of an interface circuit connected to an IEC61158-2 legacy device or a higher speed device, according to an embodiment of the invention.

The figures are not to scale, and same or similar reference signs denote same or similar features.

The schematic circuit diagram of FIG. 1 shows an interface circuit connected to a device 6. In this embodiment, the device 6 is either an IEC61158-2 Fieldbus device, or a higher speed device. The IEC61158-2 Fieldbus device communicates using Manchester coding at 31.25 Kbps, as will be apparent to those skilled in the art. The higher speed device in this embodiment communicates using 8B10B coding with amplitude shift keying (ASK) modulation at speeds of between 2 Mbps and 10 Mbps. The 8B10B coding is a known type of coding that can be used to ensure dc balance, as will be apparent to those skilled in the art. The amplitude shift keying may be 2ASK, a type of ASK where only two different symbols are used to encode the incoming bitstream. However, other types of coding schemes, modulation formats, and transmission speeds could be used in alternate embodiments.

The interface circuit interfaces with whichever one of these device 6 types is connected to it. The device 6 is connected to a universal interface, which includes a data bus interface 7, via a 2-wire bus cable 5. The data bus interface 7 connects a two conductor data bus 14 of the interface circuit to the bus cable 5. The bus cable 5 may form a spur circuit within the typical trunk & spur configurations of known Fieldbus networks.

The data bus interface 7 is powered by an intrinsically safe, low output impedance voltage source 12, which is compatible with either device 6 type, and is IEC60079-11 rated. The voltage source 12 is voltage-limited, and its output current to the data bus interface 7 is limited by an infallible resistor 4, which provides Intrinsically safe current limiting. The infallible resistance 4 is sized to be compliant with IEC60079-11, and preferably to meet Zone 0 requirements, but may also be sized for Zone 2 and/or any Gas Group or Dust Group. In an alternate embodiment, the voltage source 12 is not an intrinsically safe voltage source, and so does not comply with IEC60079-11.

Between the low impedance voltage source 12 and the infallible resistor 4, to satisfy the correct modulation impedance for both device 6 types, a reactance 10 is inserted so that the data bus can be modulated by signals from a transmitter 13, and isolated from the low impedance voltage source 12. In this embodiment the reactance 10 is an inductor, but it could alternatively be formed by an LC or LCR circuit or an active gyrator. The infallible resistor 4 is connected between the data bus 14 and the reactance 10, so that the infallible resistor 4 and the reactance 10 are connected in series between the data bus 14 and the voltage source 12.

To transmit data to the device 6, the low impedance transmitter 13 is connected to the data bus at any point downstream of the reactance 10, but in this particular embodiment is connected between the reactance 10 and the infallible resistor 4, at a point 15. This transmitter 13 is voltage driven modulator, and can transmit using both low speed and high speed protocols. The transmitter 13 is configured to transmit at the correct voltages on the data bus, suited to the device 6 type.

To receive data from the device 6, the circuit comprises a high impedance receiver 1, which may be connected 2 to any point of the data bus downstream of the reactance 10. In this embodiment, if the device 6 is a legacy (IEC61158-2 Fieldbus) device, then the end of the bus cable 5 where the device 6 is connected will not be fitted with a 100 Ohm terminator. A 100 Ohm terminator is normally required to satisfy IEC61156-2 spur rules, and is in effect provided by the interface circuit, rather than by a dedicated terminator device.

The legacy device has a constant current transmitting circuit, and so requires this impedance loading provided by the interface circuit, to prevent the signal that it transmits from exceeding a given peak to peak voltage. Otherwise the signal could be distorted and/or lead to exceeding the receiver's 1 input voltage span. When the device 6 is transmitting, the receiver 1 must be able to detect the signal when the device 6 is transmitting at the lowest allowable voltage level, or the equivalent voltage derived from the lowest contestant current value, and to account for any attenuation generated by the interface circuit.

Since the interface circuit's transmitting device 13 has a low impedance output, which would significantly load any signal transmitted from the legacy device so much that the signal would no longer be detectable by the receiver 1, an impedance 3 is inserted at the output of the transmitter 13 to increase the load impedance between the transmitter 13 and the device 6. The impedance 3 appears in series with the infallible resistance 4, between the transmitter 13 and the data bus 14, such that the resistance 4 and impedance 3 are added. In this embodiment, the resistance 4 and impedance 3 add to provide an approximate 100 Ohm terminating resistance or impedance load. This is seen, by the device 6, to be effectively across the bus cable 5.

In the case where the device 6 is the higher speed device, the higher speed device is fitted with an integrated terminator (not shown). This is because it will not see the impedance provided by the interface circuit, as the wavelength of its signal transmissions may be short compared to the length of the cable 5, as will be apparent to those skilled in the art.

Signals transmitted into the interface circuit on the data bus 14 will see a load of approximately 100 Ohms (discounting the reactance 10), which will damp or curtail any high speed device signal reflections and provide a signal loading for any legacy device, which is an accepted load for legacy type IEC61158-2 devices which have an intrinsically safe output port.

Ideally, the load should be 50 Ohms for legacy IEC61158-2 devices, however, the typical load for intrinsically safe devices, comprising a mandatory infallible resistance connected to the data bus, can be anywhere in the region between 50 Ohms, and 140 Ohms, and remain compliant. Therefore, 100 Ohms will be compliant.

When the connected device 6 is a legacy IEC61158-2 device, the transmitter 13 will have very little loading because a legacy IEC61158-2 device typically has a very high input impedance, typically greater than 3 kOhms. This may lead to circuit instability or ringing or oscillation when the transmitter transmits signals. Should a lower impedance be required for transmitter loading, and/or should the transmitter 13 require a lower loading than the device impedance, then an additional shunt impedance 9, can be switched in automatically or manually, using a switch 8. The switching can be controlled based on which type of device 6 is attached.

The additional shunt impedance 9 may be complimented by another shunt impedance 11 local to the transmitter 13, which is connected in series with a switch for switching the impedance 11 in or out of the circuit. Although, in an alternate embodiment, the impedance 11 may be permanently connected between the transmitter outputs, without the switch. Theoretically, a low output impedance voltage transmitter will not require any stabilising circuits when driving into a high impedance circuit, when the length of the bus cable 5 is limited to 120 m. However, if instability is apparent, then the extra loading (impedance 11 and/or impedance 9) may be required or required to be switched in for the legacy device.

The impedances 9 and 11 may each comprise a resistor connected in series with a capacitor. The capacitor allows any dc component to be removed.

When the connected device 6 is a higher speed device, the impedance loading offered to the output of the transmitter 13 is sufficient, without the impedances 9 and 11, which can be switched out. This is because the transmitter will be transmitting at higher frequency and so the characteristic impedance of the bus cable 5 is seen by the transmitter 13, rather than the input impedance of the higher speed device. The loading for the transmitter 13 will be only the cable 5, and impedance 3 and resistance 4. Since the impedance 3 and resistance 4 together provide an impedance of 100 Ohms, and the characteristic impedance of the cable is 100 Ohms, the loading on the transmitter will be 200 Ohms.

When the higher speed device is transmitting, it will see an impedance load of 50 Ohms. This is made up of the higher speed device's own 100 Ohm terminator, and the 100 Ohm characteristic impedance of the bus cable 5, which appear in parallel with one another. The 100 Ohm terminator, and the 100 Ohm input impedance of the impedance 3 and resistance 4, both match the characteristic impedance of the bus cable 5 and so will help prevent signal reflections.

The transmitter 13 comprises two transmitter circuits, which are activated depending on which type of device 6 (legacy or high speed) is attached. The transmitter can be automatically or manually switched to select one of the transmitter circuits for use, with the unused transmitter circuit being isolated. In an alternate embodiment, a single transmitter circuit handles communications from both legacy and high speed devices.

Figure 1B:
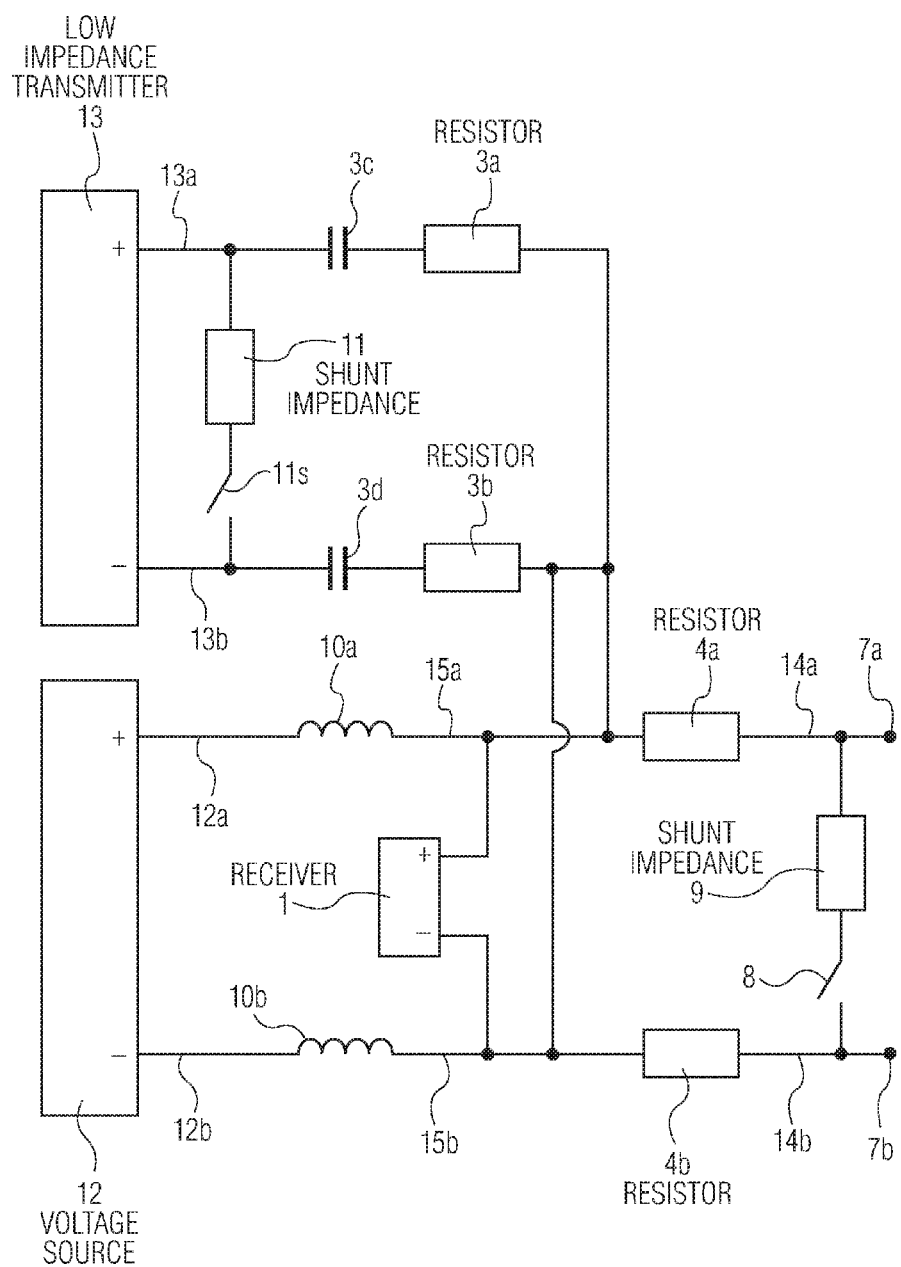
FIG. 1b shows a more detailed circuit diagram of one way in which the circuitry of FIG. 1a may be configured.

A circuit diagram showing one way in which the schematic circuit of FIG. 1*a* can be implemented, will now be described with reference to FIG. 1*b*. The data bus interface 7 comprises two connector terminals 7*a* and 7*b*, to which the two wires of the 2-wire bus cable 5 can be connected. The two connector terminals 7*a* and 7*b* are connected to positive and negative polarity conductors 14*a* and 14*b*, respectively, of the data bus 14.

The infallible resistance 4 is formed by two series resistors 4*a* and 4*b*, which are connected in the positive and negative polarity conductors 14*a* and 14*b* respectively. The series resistors in this embodiment each have a resistance of 25 Ohms, and so together form a balanced 50 Ohm resistance in the data bus. Similarly, the reactance 10 is formed by two series inductors 10*a* and 10*b*, which are connected to the positive and negative polarity conductors 14*a* and 14*b* respectively, via the series resistors 4*a* and 4*b*. The voltage source 12 has positive and negative voltage output terminals connected to the positive and negative polarity conductors 14*a* and 14*b* respectively, via the series inductors 10*a* and 10*b* and the series resistors 4*a* and 4*b*.

At the point 15 along the data bus, between the infallible resistance 4 and the reactance 10, the impedance 3 is connected. The impedance 3 is formed by two series resistors 3*a* and 3*b*, and two series capacitors 3*c* and 3*d*. The positive polarity conductor 15*a* at point 15 is connected to the resistor 3a and capacitor 3c, which are arranged in series with one another, between the conductors 15a and 13a. The negative polarity conductor 15b at point 15 is connected to the resistor 3b and capacitor 3d, which are arranged in series with one another, between the conductors 15b and 13b. The conductors 13a and 13b are the positive and negative polarity outputs of the transmitter 13. The two series resistors 3a and 3b each have a resistance of 25 Ohms in this embodiment, and so together form a balanced 50 Ohm resistance between the output of the transmitter and the point 15.

The receiver 1 is connected at point 15, between the positive and negative polarity conductors 15a and 15b, for receiving voltage signals sent on the data bus 14. In an alternate embodiment, the receiver 1 may be connected to a potential divider between the positive and negative polarity conductors 15a and 15b, to help ensure that the voltage levels it receives are within its range. In alternate embodiments, the receiver 1 could be connected between the positive and negative polarity conductors at any point between the transmitter 13 and the data bus interface 7.

The additional impedance 9 and switch 8 are connected in shunt between the positive and negative polarity conductors 14a and 14b. The another impedance 11 and switch 11s are connected in shunt between the positive and negative polarity conductors 14a and 14b.

To help illustrate the AC impedances that are seen by the transmitter 13 and device 6 when sending signals, various AC equivalent circuits will now be described with reference to FIGS. 2a to 2d. The various reactive components and device receive inputs have high impedances and so are ignored in these equivalent circuits. Since these are equivalent circuits, the impedance 3 and infallible resistor 4 in FIGS. 2a and 2b are shown in the positive polarity conductor, whereas in reality they are actually split between the positive and negative polarity conductors, as shown in FIG. 1b.

Figure 2A:
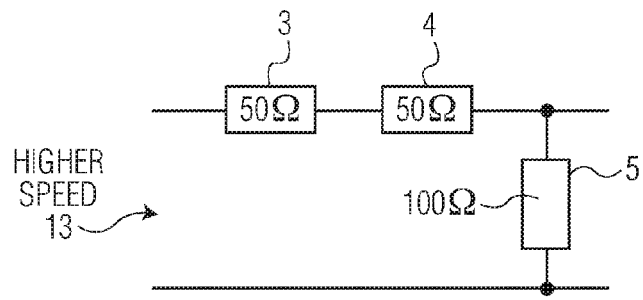
FIG. 2a shows an equivalent circuit diagram of the AC impedance seen by a transmitter of the interface circuit when transmitting to the higher speed device.

FIG. 2a shows the AC equivalent circuit that the transmitter 13 sees when it is transmitting higher frequency signals towards the device 6, the device 6 being a higher speed device. The transmitter 13 sees the impedance 3 and infallible resistor 4 in series, and the characteristic impedance of the bus cable 5 in shunt, so that the total loading on the transmitter output is 200 Ohms. The higher speed device has an internal terminator, however this is not seen by the transmitter 13 due to the short wavelength of the higher frequency transmitted signals.

Figure 2B:
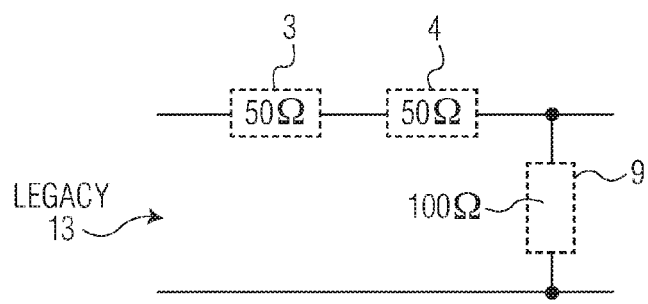
FIG. 2b shows an equivalent circuit diagram of the AC impedance seen by a transmitter of the interface circuit when transmitting to the IEC61158-2 legacy device.

FIG. 2b shows the AC equivalent circuit that the transmitter 13 sees when it is transmitting lower frequency signals towards the device 6, the device 6 being a legacy IEC61158-2 device. Since the device 6 is a legacy device, the switch 8 is closed, connecting the impedance 9 into shunt with the two conductors 14a and 14b of the data bus. Then the transmitter 13 sees the impedance 3 and infallible resistor 4 in series, and the impedance 9 in shunt, so that the total loading on the transmitter output is again 200 Ohms. The transmitter 13 does not see the characteristic impedance of the bus cable 5 when the legacy IEC61158-2 device is connected, because the signalling frequency of the transmitter 13 is lower, so that transmission line effects are not significant, as will be apparent to those skilled in the art. The impedances 3, 4, and 9 are shown in dotted lines because they are only relevant when the switch 8 is closed. If the switch 8 is open, then the impedances 3 and 4 are dominated by the very large input impedance of the legacy IEC61158-2 device (around 3 kOhms).

Figure 2C:
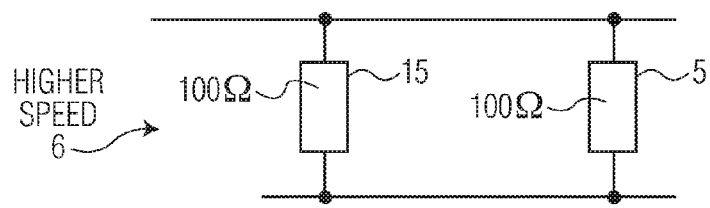
FIG. 2c shows an equivalent circuit diagram of the AC impedance seen by the higher speed device when transmitting to the interface circuit.

FIG. 2c shows the AC equivalent circuit that the device 6 sees when it is transmitting higher frequency signals to the interface circuit, the device 6 being a higher speed device. The higher speed device has an integral terminator 15 of 100 Ohms in shunt. This helps regulate the voltage fluctuations that occur when its current sources modulate current at high frequency. The higher speed device also sees the 100 Ohm characteristic impedance of the bus cable 5, in parallel with the integral terminator 15. Accordingly, the higher speed device sees an impedance of 50 Ohms. The impedances in the interface circuit are not seen by the higher speed device, because of its high signalling speed. Once the signals sent from it reach the interface circuit, they will see the impedances 3 and 4, totalling 100 Ohms, and matching the characteristic impedance of the bus cable 5.

Figure 2D:
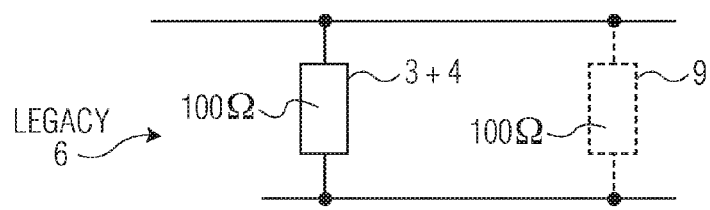
FIG. 2d shows an equivalent circuit diagram of the AC impedance seen by the IEC61158-2 legacy device when transmitting to the interface circuit.

FIG. 2d shows the AC equivalent circuit that the device 6 sees when it is transmitting lower frequency signals to the interface circuit, the device 6 being a legacy IEC61158-2 device. Since the device 6 is a legacy device, the switch 8 is closed, connecting the impedance 9 into shunt with the two conductors 14a and 14b of the data bus. The legacy device does not have any terminators, and transmits at a lower frequency, so transmission line effects of the bus cable 5 are not seen. Accordingly, the legacy device sees the shunt impedance 9, and the impedances 3 and 4 in shunt, giving a loading of 50 Ohms. The impedances 3 and 4 appear in shunt in the equivalent circuit, because they are connected to the transmitter 13, which in effect absorbs AC signals directed towards it, as will be apparent to those skilled in the art.

Figure 3A:
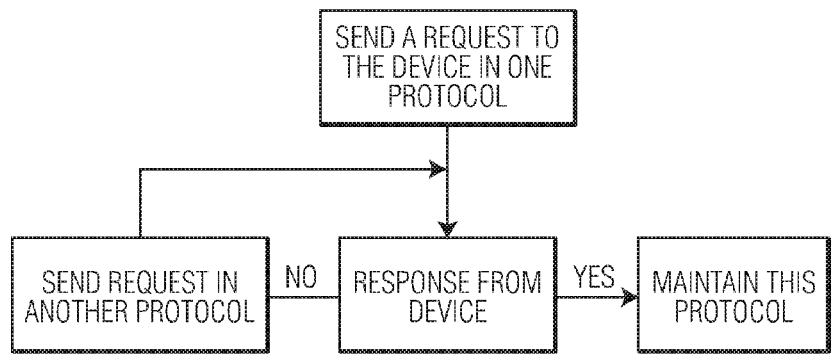
FIG. 3a shows a flow diagram of a process according to an embodiment of the invention for establishing which type of device is connected to the interface circuit.
Figure 3B:
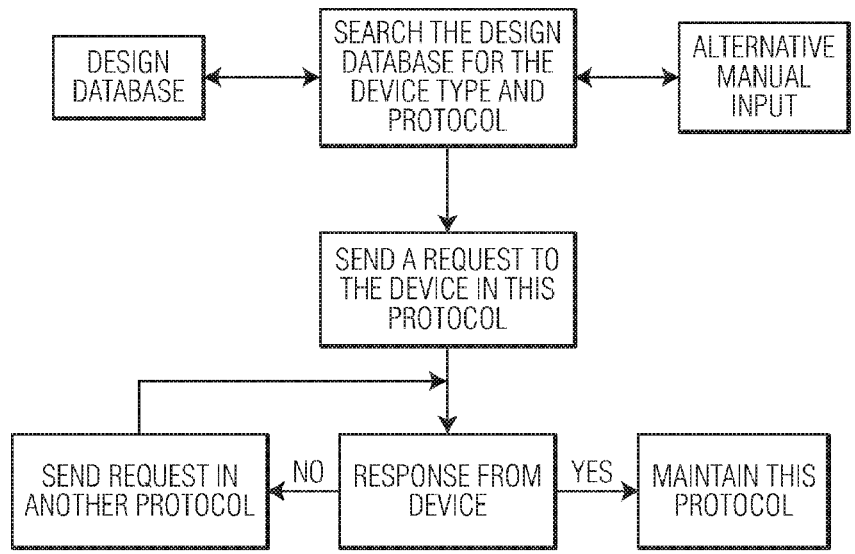
FIG. 3b shows a flow diagram of another process according to an embodiment of the invention for establishing which type of device is connected to the interface circuit.

Processes for the interface circuit to detect or establish which type of device 6 is connected to it are shown in FIGS. 3a and 3b. FIG. 3a uses a method of polling or interrogating the device using differing protocols until a response is returned from the device. FIG. 3b uses a design database to establish, in advance, which protocol to use, and to then communicate in the correct protocol without having to integrate the device first. It may also use an interrogation method as per FIG. 3a should the device be a different type than that listed in the design database.

Many other variations of the described embodiments falling within the scope of the invention will be apparent to those skilled in the art.

The invention claimed is:

1. An interface circuit comprising a data bus interface and a transmitter and receiver for sending and receiving data via the data bus interface, wherein:

the data bus interface comprises two bus conductors consisting of a positive polarity conductor and a negative polarity conductor that provide combined power and data, and connector terminals for connecting the two bus conductors to one of a first device that communicates in a first signalling protocol and a second device that communicates in a second signalling protocol, the first and second signalling protocols being different protocols to one another, wherein the interface circuit is configured to select between the first signalling protocol and the second signalling protocol depending on which one of the first and second devices are connected via the connector terminals; and the interface circuit further comprises a voltage source for powering the two bus conductors, the voltage source being connected to the two bus conductors via a reactance and then a first resistance connected in series, wherein an output of the transmitter is connected via a second resistance to a point between the reactance and the first resistance, to modulate the voltage between the two bus conductors.

2. The interface circuit of claim 1, wherein the first signalling protocol has a first signalling speed and the second signalling protocol has a second signalling speed, the second signalling speed being higher than the first signalling speed.

3. The interface circuit of claim 1, wherein the first signalling protocol and the second signalling protocol have different physical layer characteristics to one another.

4. The interface circuit of claim 1, wherein the first and second resistances sum to a value matching a load impedance that is required by the first signalling protocol.

5. The interface circuit of claim 1, wherein the interface circuit is configured to select between the first signalling protocol and the second signalling protocol by transmitting data via the two bus conductors in a selected one of the first and second signalling protocols, and:
  if a valid response to the transmitted data is received by the receiver, determine that a device using the selected one of the signalling protocols is connected to the data bus interface; or
  if a valid response to the transmitted data is not received by the receiver, transmit data via the two bus conductors in another one of the signalling protocols, and determine that a device using that one of the protocols is connected to the data bus interface if a valid response to that data is received by the receiver.

6. The interface circuit of claim 1, wherein the interface circuit is configured to select between the first signalling protocol and the second signalling protocol based on an amount of current drawn by a device that is connected, or based on an initial attachment characteristic of the device.

7. The interface circuit of claim 1, wherein the transmitter comprises a plurality of transmitter circuits which are switched between depending on which signalling protocol is selected to be used by the transmitter.

8. The interface circuit of claim 1, wherein the first resistance has a rated resistance, and is an infallible resistor configured to present at least the rated resistance upon occurrence of a fault in the resistor.

9. The interface circuit of claim 1, wherein the first resistance comprises a series resistor in the positive polarity conductor and a series resistor in the negative polarity conductor.

10. The interface circuit of claim 1, wherein the second resistance comprises a series resistor in the positive polarity conductor and a series resistor in the negative polarity conductor.

11. The interface circuit of claim 1, wherein the output of the transmitter is connected via a capacitance and the second resistance to the point between the reactance and the first resistance, the capacitance and the second resistance being connected in series.

12. The interface circuit of claim 1, further comprising an additional impedance and switch for switching the additional impedance into connection between the positive and negative polarity conductors of the two bus conductors, the additional impedance being connected to the two bus conductors at a point between the first resistance and the connector terminals.

13. The interface circuit of claim 1, further comprising another impedance connected between the positive and negative polarity conductors of the two bus connectors, this another impedance being connected to the two bus conductors via the first and second resistances at the output of the transmitter.

14. The interface circuit of claim 1, wherein the first and second devices are connectable to the connector terminals by connecting a first end of a bus cable to the connector terminals, and connecting either the first device or the second device to a second end of the bus cable.

15. The interface circuit of claim 14, wherein the first and second resistances sum to a value matching a characteristic impedance of the bus cable, the characteristic impedance being required by the second signalling protocol.

16. The interface circuit of claim 1, wherein the first device is connectable to the connector terminals by connecting a first bus cable to the connector terminals, the first bus cable being connected to the first device, and wherein the second device is connectable to the connector terminals by connecting a second cable bus to the connector terminals, the second bus cable being connected to the second device.

17. A network switch or network device coupler, comprising the interface circuit of claim 1.

18. A network comprising the network switch or network device coupler of claim 17, a bus cable, and one of the first and second devices, wherein a first end of the bus cable is connected to the connector terminals, and a second end of the bus cable is connected to the one of the first and second devices.

* * * * *